G. L. KNIGHTS.
ROTARY CUTTING MACHINE.
APPLICATION FILED JUNE 28, 1912.
1,060,908.
Patented May 6, 1913.
4 SHEETS—SHEET 3.
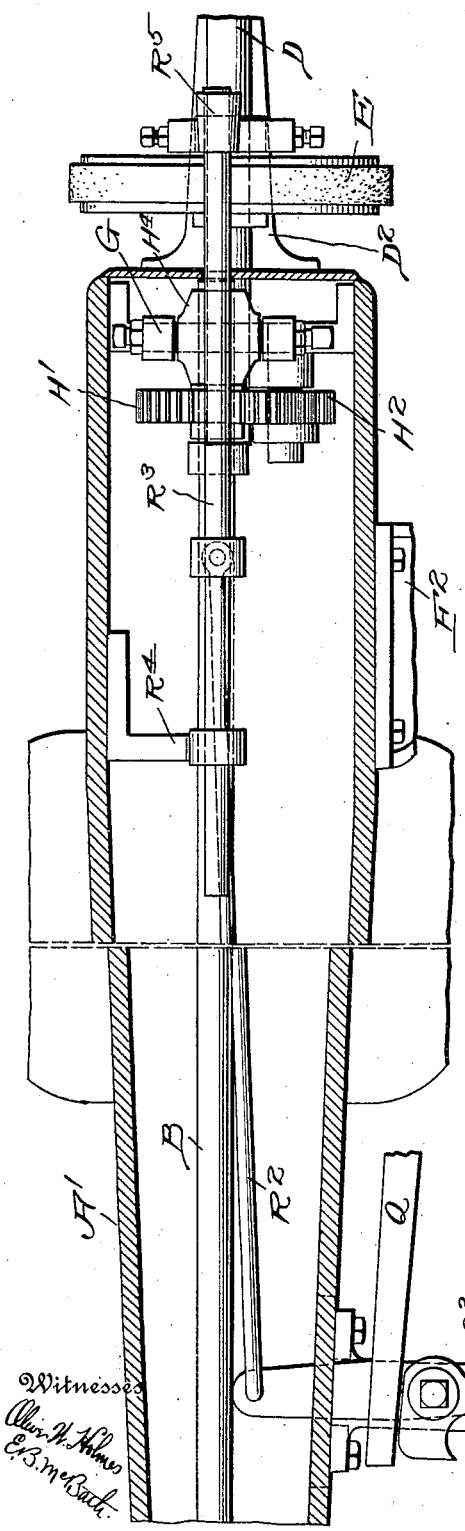
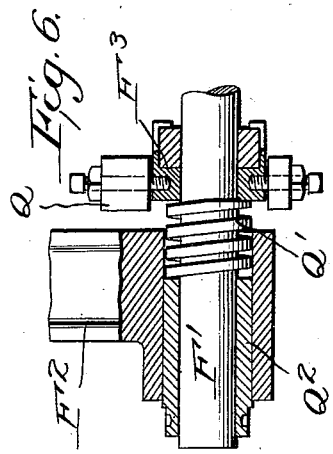
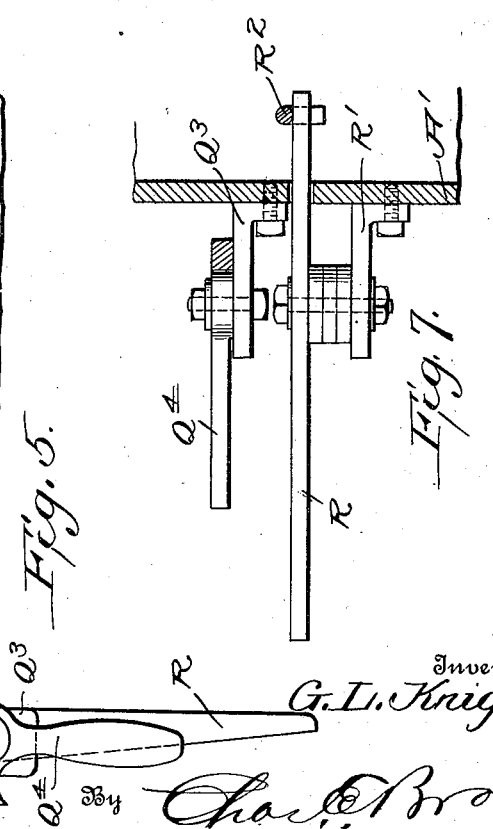
Inventor
G. L. Knights
By Chas. E. Brock
Attorney
Witnesses G. L. KNIGHTS.
ROTARY CUTTING MACHINE.
APPLICATION FILED JUNE 28, 1912.
1,060,908.
Patented May 6, 1913.
4 SHEETS—SHEET 4.
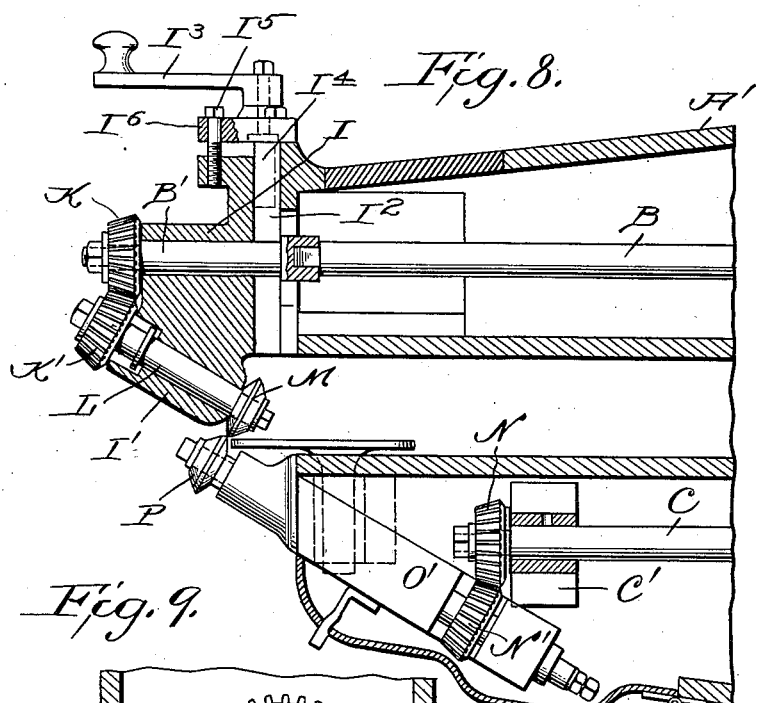
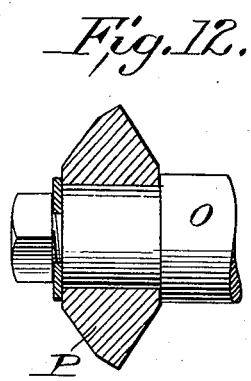
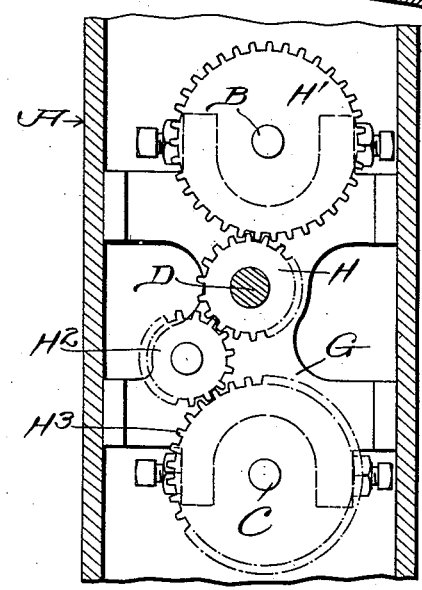
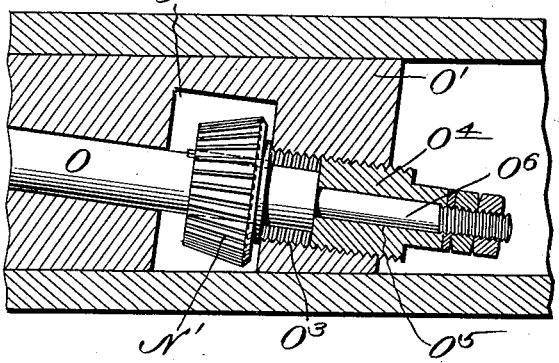
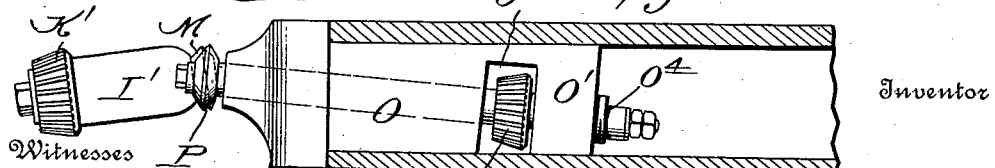

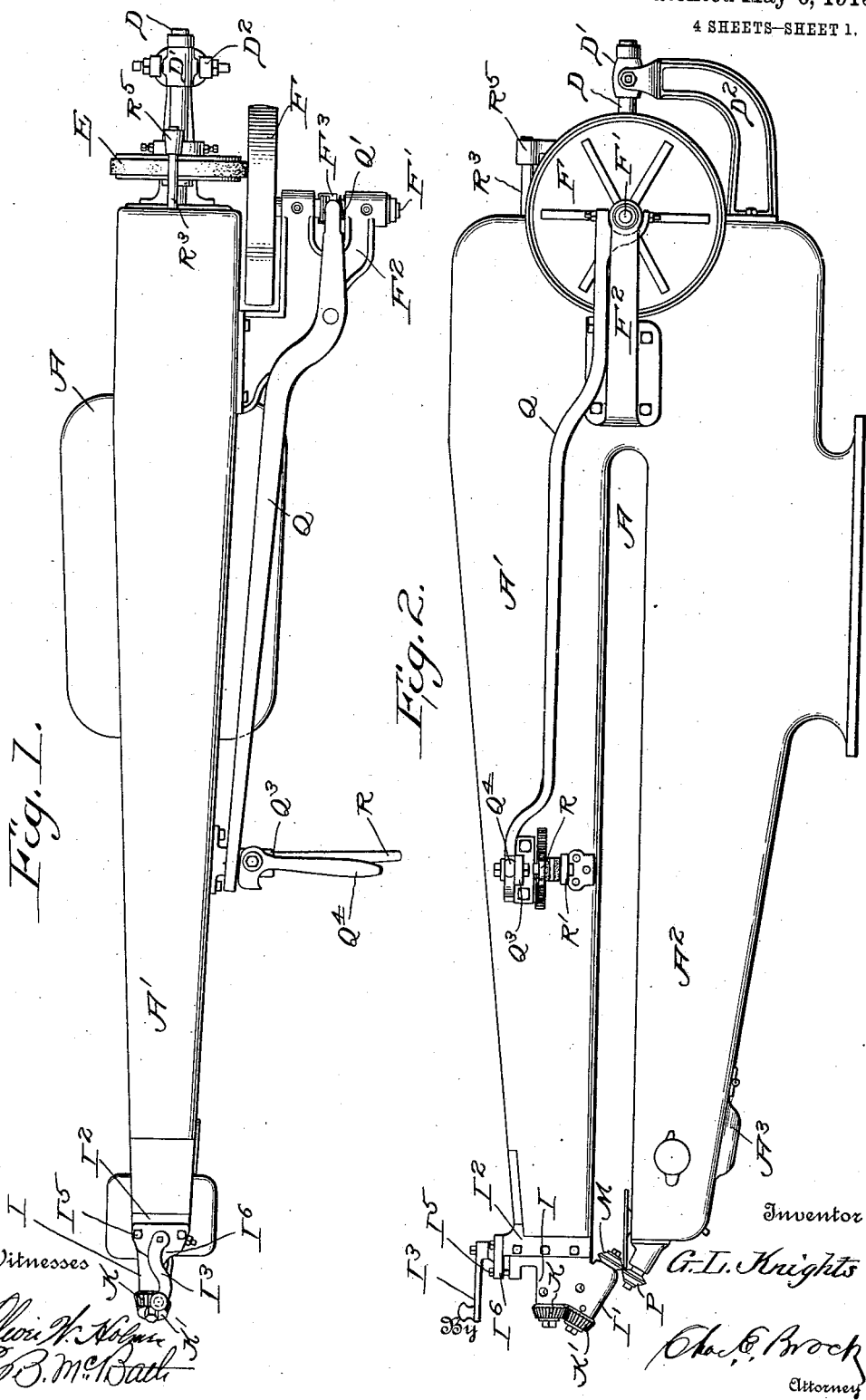

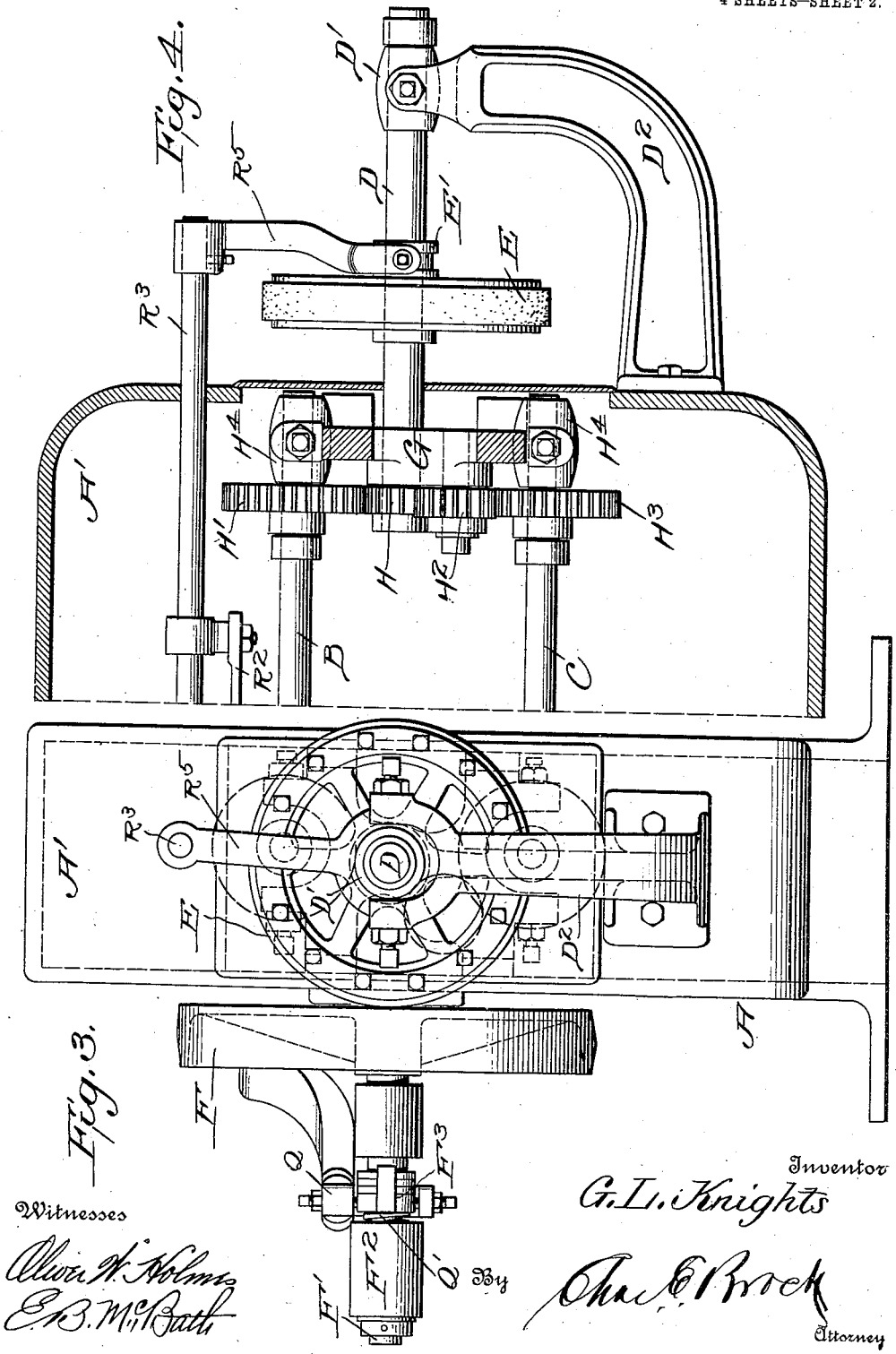

UNITED STATES PATENT OFFICE.

GEORGE L. KNIGHTS, OF AMESBURY, MASSACHUSETTS, ASSIGNOR TO PETTINGELL MACHINE COMPANY, OF AMESBURY, MASSACHUSETTS, A CORPORATION OF MASSACHUSETTS.

ROTARY CUTTING-MACHINE.

1,060,908.

Specification of Letters Patent.

Patented May 6, 1913.

Application filed June 28, 1912. Serial No. 706,535.

*To all whom it may concern:*

Be it known that I, GEORGE L. KNIGHTS, a citizen of the United States, residing at Amesbury, in the county of Essex and State of Massachusetts, have invented a new and useful Improvement in Rotary Cutting-Machines, of which the following is a specification.

This invention is a rotary cutter for cutting sheet metal, and the object of the invention is to provide a device which can be operated at varying degrees of speed without necessitating the change of gears, or changing from power to hand drive.

Another object of the invention is to provide a machine which can be instantly stopped whenever desired, and a still further object is to provide a machine in which various adjustments required can be quickly and easily made.

With these objects in view, and also certain other objects, as will appear hereinafter, my invention resides in the novel features of construction, and arrangement of parts which will be fully described hereinafter and pointed out in the claims.

In the drawings forming a part of this specification: Figure 1 is a top plan view of a rotary cutting machine constructed in accordance with my invention. Fig. 2 is a side view of the same. Fig. 3 is a rear end view. Fig. 4 is an enlarged sectional elevation taken through the rear portion of the machine and illustrating the drive and transmission. Fig. 5 is a sectional plan view showing the means for varying the speed and also for stopping the machine. Fig. 6 is a detail sectional elevation of the clutch for starting and stopping the machine. Fig. 7 is a detail view showing the relative showing of the levers for operating the machine and changing the speed. Fig. 8 is an enlarged detail sectional elevation showing the manner of adjusting the cutter shafts. Fig. 9 is a detail view of the transmission and means for supporting the same. Fig. 10 is an enlarged detail view of the lower cutter shaft, and, Fig. 11 is a detail plan view showing the relative positions of the upper and lower cutter shafts. Fig. 12 shows a detail view of cutter and end of cutter shaft.

In carrying out my invention, I employ a cast metal case A, having upper and lower jaws A' and A², the operative parts being largely contained within the said upper and lower jaws and rear portion of the case, the cutters being arranged at the forward ends of said upper and lower jaws. In the upper jaw A' is arranged a rotary shaft B, which operates the upper cutter and in the lower jaw is a rotary shaft C, which operates the lower cutter, the power of these upper and lower shafts being transmitted by intervening devices as more fully described hereinafter. These upper and lower shafts are operated from a common power shaft D, which has a shiftable friction pulley mounted thereon, which friction pulley E, is adapted to be engaged by a driving disk F, and by means of which the power shaft is rotated and by adjusting the position of the friction pulley E with reference to the center of the power disk F, as hereinafter fully explained the speed of the power shaft and consequently the cutters can be regulated to any degree desired.

A casting G is secured in the rear portion of the cast iron casing, said casting carrying bearings for the power shaft upon which is mounted the main or power gear H, and this main or power gear meshes with an upper gear H', mounted upon the upper shaft. The power gear also meshes with an idler H², which is also carried by the casting and is preferably made with twenty five teeth and this idler in turn meshes with a lower gear H³, mounted upon the lower shaft C, said lower gear also having forty eight teeth.

The upper and lower shafts are mounted in suitable hangers H⁴ connected to the casting previously described. The forward end of the upper shaft is squared and fits into the socketed rear end of a short shaft B' journaled in a vertically adjustable block I arranged at the forward end of the upper jaw, and upon the forward end of this short or stub shaft is arranged the bevel gear K which in turn meshes with another bevel gear K' mounted upon the forward end of an inclined shaft L journaled in the depending portion I' of the aforesaid adjustable block, the rear and lower end of this inclined shaft having the upper rotary cutter M mounted thereon. The block or casting I carrying these shafts is vertically adjustable in a grooved guide-way I² which closes the forward end of the upper jaw, the adjustment being attained by means of a crank handle I³ operating a screw I⁴ and the downward movement is limited by means of a headed screw I⁵ connected to the adjustable block or casting and working through the overhanging portion I⁶ of the slotted guide as most clearly shown in Figs. 2 and 8. This overhanging portion also serves as a stop to limit the upward movement of the said parts. The forward end of the lower shaft is journaled in a suitable bearing C' adjacent the forward end of the lower jaw, and the same carries a bevel gear N at its forward end said bevel gear meshing with a similar gear N' mounted upon the lower cutter shaft O which is inclined as shown, said shaft being arranged in a casting O' which is introduced into, and rigidly attached to the forward end of the lower jaw A². This casting serves as a bearing for the lower cutter shaft O, the upper forward end projecting beyond the forward end of said casting, and adjacent the rear end of said casting, which is contained within the lower jaw, there is provided an opening or recess O² to receive the bevel gear N' which meshes with the bevel gear N mounted upon the forward end of the lower shaft C. The extreme lower rear end of the casting which also serves as a bearing for the lower cutter shaft has a threaded bore O³ in which works a threaded plug O⁴ having a central bore O⁵, through which passes the reduced end O⁶, of the cutter shaft; and by adjusting the position of this threaded plug it is obvious that the lower cutter shaft and consequently the lower cutter P itself will be adjusted with reference to the position of the upper shaft.

It will be understood from the above description, that by rotating the friction disk by means of a belt or other suitable power, rotary motion is transmitted to the friction pulley which in turn operates the power shaft and this power is transmitted to the upper and lower shafts contained within the upper and lower jaws, and these upper and lower shafts in turn drive the upper and lower cutter shafts rotating the cutters so that sheet metal passed between said cutters will be quickly and easily cut.

In practice, I prefer to arrange the upper shaft slightly to one side of the longitudinal center of the upper jaw of the machine, and also to arrange the lower cutter shaft slightly at an oblique angle to the longitudinal center of the lower jaw, so that the cutting edges of the two cutters will cross each other as most clearly shown in Fig. 11, thereby providing for the proper shearing action.

The friction disk F is mounted upon a shaft F', which is journaled in a bracket F², attached to the cast metal casing and extending laterally therefrom, said shaft having a clutch F³ arranged thereon which is operated by means of a lever Q and a spring Q', the spring surrounding the shaft and held in place by means of an adjustable sleeve Q², by means of which the tension of the spring can be regulated. The tendency of this spring is to normally project the friction disk toward the friction pulley, and the lever Q previously referred to and which is pivoted to the bearing bracket is for the purpose of moving the said clutch back against the tension of the spring and carrying with it the friction disk F thereby stopping the machine; and this lever which has its short arm connected with the clutch and its lower arm extended forwardly is engaged by an eccentric headed hand lever Q⁴ pivoted to a bracket Q³ on the side of the upper arm and by means of which the clutch lever can be moved over for the purpose of drawing the friction disk out of engagement and consequently stopping the machine. When the hand lever is in the position shown in Fig. 1, the spring acting upon the clutch, forces the friction disk into engagement with the friction pulley, but when the hand lever is thrown forwardly the clutch lever is operated to withdraw the friction disk.

For the purpose of shifting the position of the friction disk I employ a lever R pivoted to a second bracket R' attached to the side of the upper arm and this lever is somewhat longer than the hand lever previously referred to. The inner end of this lever R has a rod R² connected thereto, the rear end of said rod being connected to a shifting bar or shaft R³ which works through a suitable guide R⁴ within the upper arm and has its rear end extending through the rear end of the casing, and attached to the extreme end of this shifting bar or shaft is a bifurcated arm R⁵ attached to the grooved hub or collar E' of the friction pulley. It is obvious that by moving the lever back or forth the friction pulley is moved back and forth upon the power shaft, and by thus shifting its position with reference to the center of the friction disk, the rate of speed can be accurately controlled.

The power shaft, as most clearly shown in Fig. 4, projects rearwardly from the cast metal casing and has its rear end journaled in the hanger or bearing D' carried by a rearwardly extending bracket D² attached to the rear end of the cast metal case.

The lower forward end of the lower jaw has a hinged door or closure A³, which can be opened whenever the adjustment of the lower cutter shaft is desired. The forward end of the upper jaw has an opening provided therein when first made, in order to enable the reduced end of the shaft to be properly connected with the socketed end of the stub shaft, but this opening is afterward firmly closed as most clearly shown in Fig. 8.

What I claim is:—

1. In a rotary cutter of the kind described, the combination with the cutters, of the shafts carrying said cutter and means for rotating said shafts, said shafts being inclined and in parallel planes, said shafts also being in intersecting vertical planes whereby the cutting edges of the cutters cross each other as set forth.

2. In a rotary cutter of the kind described, the combination with a metallic casing with the upper and lower shafts journaled therein, and means for rotating said shafts, the upper and lower cutter shafts and intervening means for operating said shafts, the upper cutter shafts being vertically adjustable and the lower cutter shaft being longitudinally adjustable, said cutter shafts being inclined and paralleled, their adjacent ends overlapping.

3. In a rotary cutter of the kind described, the combination with a metallic casing with the upper and lower shafts journaled therein, and means for rotating said shafts, the upper and lower cutter shafts and intervening means for operating said shafts, the upper cutter shafts being vertically adjustable and the lower cutter shaft being longitudinally adjustable, said cutter shafts being inclined and paralleled, their adjacent ends overlapping, said cutter shafts being in intersecting vertical planes whereby the cutters have their cutting edges cross each other as set forth.

4. In a rotary cutter of the kind described, the combination with a metallic casing having the upper and lower rotary shafts together with means for rotating the same, the inclined cutter shaft and intervening means for rotating the same, the vertically adjustable block arranged at the forward end of the metallic casing, a cutter shaft carried thereby together with means for rotating said cutter shaft and the rotary cutters arranged upon the adjacent ends of said cutter shafts, the cutting edges of said cutters crossing each other as set forth.

5. In a rotary cutter of the kind described, the combination with the upper scribed, the combination with the upper arm of a casing, of the grooved guide-way attached to the forward end thereof, the adjustable block or casting movable in said guide-way together with means for adjusting the same, the upper rotary shaft, the stub shaft, the inclined cutter shaft and cutter, together with means for transmitting the rotary motion of the rotary shaft to the inclined cutter shaft and cutter as set forth.

6. In a rotary cutter of the kind described, the combination with the lower arm of the metallic casing, of the lower rotary shaft, an inclined casting arranged in the forward end of the lower arm, a cutter shaft mounted therein, said cutter shaft being longitudinally adjustable within said casting together with means for transmitting the rotary motion of the rotary shaft to the cutter shaft as set forth.

7. In a rotary cutter of the kind described the combination with a metallic casing, of the upper and lower rotary shafts mounted therein, a power shaft and means for transmitting the power from said shaft to the upper and lower rotary shafts, a friction pulley adjustable upon the power shaft, a friction disk adapted to engage the friction pulley together with means for moving said friction disk into and out of contact as set forth.

GEORGE L. KNIGHTS.

Witnesses:
 CHAS. E. BROCK,
 M. G. LEONARD.

---

Copies of this patent may be obtained for five cents each, by addressing the "Commissioner of Patents, Washington, D. C."